(12) United States Patent
Sedgewick et al.

(10) Patent No.: US 6,433,446 B1
(45) Date of Patent: Aug. 13, 2002

(54) LINEAR MOTOR WITH KEYED MOUNTING ARRANGEMENT

(75) Inventors: James C. Sedgewick, York, ME (US); David Carroll, Strafford; Michael Drew, Milton, both of NH (US)

(73) Assignee: Airex Corporation, Dover, NH (US)

( * ) Notice: Subject to any disclaimer, the term of this patent is extended or adjusted under 35 U.S.C. 154(b) by 0 days.

(21) Appl. No.: 09/626,520

(22) Filed: Jul. 27, 2000

Related U.S. Application Data
(60) Provisional application No. 60/146,086, filed on Jul. 28, 1999.

(51) Int. Cl.[7] ............................................. H02K 41/00
(52) U.S. Cl. ........................................................ 310/12
(58) Field of Search .............................. 310/12, 13, 14, 310/42; 29/596

(56) References Cited

U.S. PATENT DOCUMENTS

| | | | | |
|---|---|---|---|---|
| 3,707,924 A | * | 1/1973 | Barthalon et al. | 310/12 X |
| 5,729,072 A | * | 3/1998 | Hirano et al. | 310/258 |
| 5,757,091 A | * | 5/1998 | Sogabe et al. | 310/12 |
| 6,008,553 A | * | 12/1999 | Gonzalez | 310/12 |

* cited by examiner

Primary Examiner—Tran Nguyen
Assistant Examiner—Judson H. Jones
(74) Attorney, Agent, or Firm—Grossman Tucker Perreault & Pflefger, PLLC

(57) ABSTRACT

The present invention provides a linear motor assembly that uses keying technique to provide a uniform mechanical interface for linear motor coils to the mount or mounting bracket. This permits a molded coil assembly to be built as a subassembly, so that later insertion into brackets of varying configurations is possible. The keying technique locks the coil to the mount or mounting bracket, and accommodates many different bracket configurations without modification to the coil assembly. The coil is keyed to the bracket and may be attached with an adhesive such as an epoxy bond or thermal grease to improve the thermal dissipation from the motor to the mounting surface. This subassembly can be pre-manufactured and transformed to an application-specific assembly with relative ease in a short period of time. Bracket or mounting options may include various cooling features such as water or air-cooling. The subassembly can also be integrated directly to a linear system comprised, for example, of bearings or encoders. This eliminates the need for a separate mounting bracket, and improves heat dissipation.

19 Claims, 3 Drawing Sheets

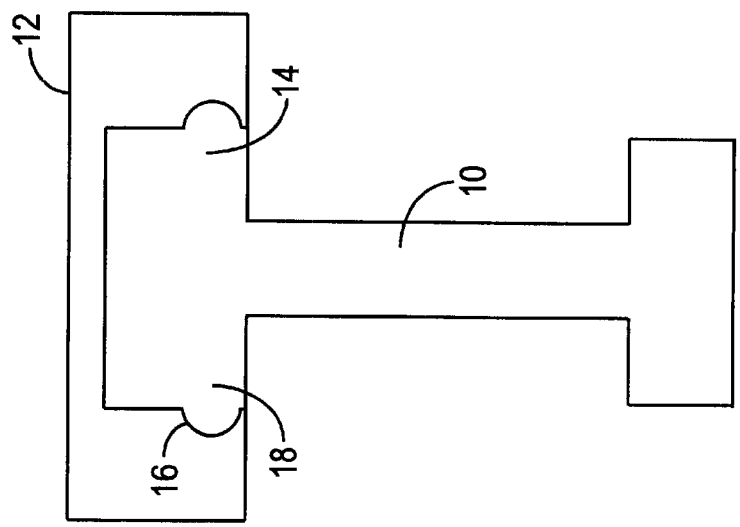
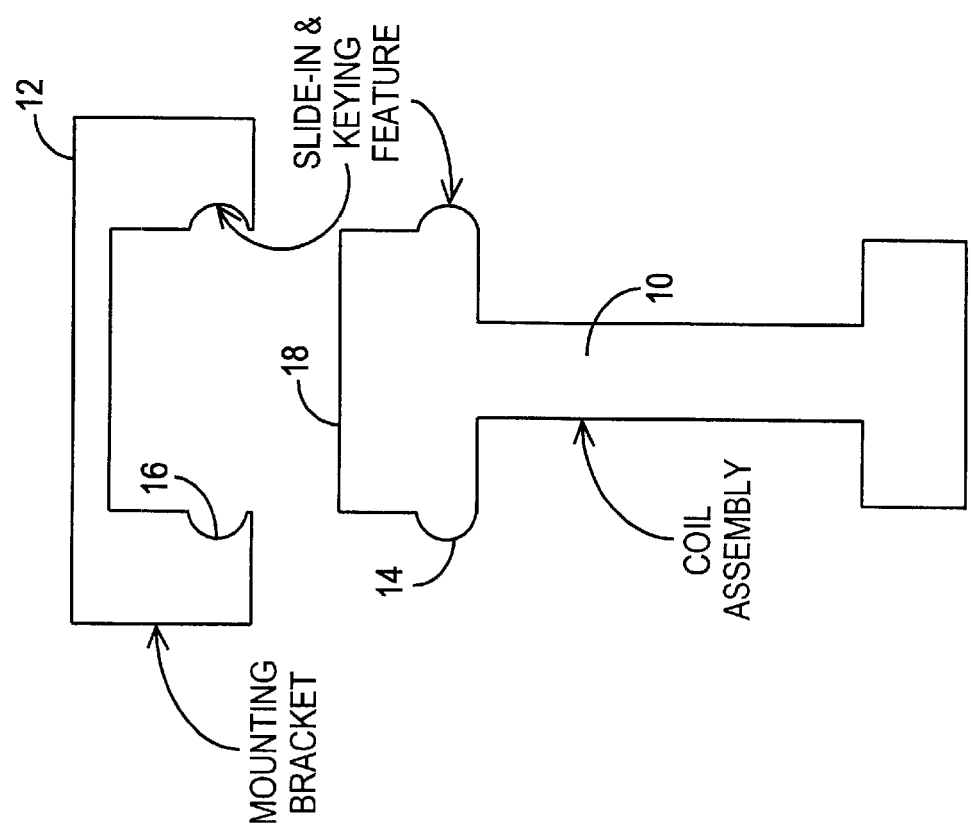

LINEAR MOTOR WITH KEYED MOUNTING ARRANGEMENT

This application claims priority from provisional application Ser. No. 60/146,086, filed Jul. 28, 1999.

BACKGROUND OF THE INVENTION

1. Field of the Invention

The present invention relates generally to a linear motor and mounting arrangement. More particularly, the present invention relates to a linear motor with a keyed interface between the coil and a bracket and/or other mounting piece. Particular utility for the present invention is in the interchangeability of motor mounts and/or coils for linear motors, although other utilities are contemplated herein.

2. Description of Related Art

The current practice in the linear motor manufacturing industry is to build complete assemblies in anticipation of customer requirements. The motors are typically finish molded with a mounting bracket or attachment bar formed integrally to the assembly. Additionally, the coils are molded directly into the mounting bracket or attachment bar. While this is an efficient manufacturing technique, this technique does not permit a manufacturer or customer to change a coil and/or mounting bracket once assembled. Rather, the manufacturer or customer must fabricate or purchase an entire assembly for each given application.

The present invention solves these drawbacks by providing a keyed interface between the coil and the mounting bracket or attachment bar, thus permitting to interchange the coil and/or mounting bracket or attachment bar easily.

SUMMARY OF THE INVENTION

Accordingly, the present invention provides a linear motor assembly that uses keying technique to provide a uniform mechanical interface for linear motor coils to the mount or mounting bracket. This permits a molded coil assembly to be built as a subassembly, so that later insertion into brackets of varying configurations is possible. The keying technique locks the coil to the mount or mounting bracket, and accommodates many different bracket configurations without modification to the coil assembly. The coil is keyed to the bracket and attached with an adhesive such as an epoxy bond or thermal grease to improve the thermal dissipation from the motor to the mounting surface. This subassembly can be pre-manufactured and transformed to an application-specific assembly with relative ease in a short period of time. Bracket or mounting options may include various cooling features such as water or air-cooling. The subassembly can also be integrated directly to a linear system comprised, for example, of bearings or encoders. This eliminates the need for a separate mounting bracket, and improves heat dissipation.

To affix the mounting bracket or carrier to the coil, a pin or an area filled with a non-magnetic material (such as resin) may be used to prevent relative movement between the coil and the mount. The keying arrangement also allows for the installation of accessories such as commutation devices, speed sensors, thermal monitoring devices or encoders. A cover that is also keyed protects internal electrical connections. A similar slide-in and keying arrangement will apply to commutation devices used in linear applications.

In one embodiment, the present invention provides a linear motor and bracket assembly, comprising a coil winding having an I-beam cross section and having a first key portion formed thereon. The assembly also includes a bracket having a second key portion. The first key portion is mated with the second key portion. The mated first and second key portions are adapted to permit the bracket and the coil winding to slideably engage one another so that the bracket covers a portion of the coil winding.

In a second embodiment, the present invention provides a linear motor with keyed mounting arrangement that includes a coil winding having a first key portion formed therein and a carrier removably affixed to the coil having a second key portion. The first key portion is mated with the second key portion, and the mated first and second key portions are adapted to permit the carrier and the coil winding to slideably engage one another so that the carrier covers a portion of the coil winding. The motor also includes a base unit having a backiron and a magnet affixed thereto arranged about said coil.

Advantageously, the keying arrangement of the present invention provides intimate contact between the motor and mount for superior thermal performance, eliminates electrical problems inherent in coils that are molded directly into brackets, minimizes accumulated tolerances to improve mechanical rigidity, enables modular manufacturing strategy, and improves molding quality resulting in better protection of coils. Also, the present invention permits interchangeable mounting brackets for a range of applications, and interchangeable cable options for a range of applications It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

BRIEF DESCRIPTION OF THE DRAWINGS

FIG. 1a is a cross-sectional view of the preferred mounting bracket and coil assembly of the present invention;

FIG. 1b is the assembled preferred mounting bracket and coil assembly of FIG. 1a;

DETAILED DESCRIPTION OF THE INVENTION

Figure 2:
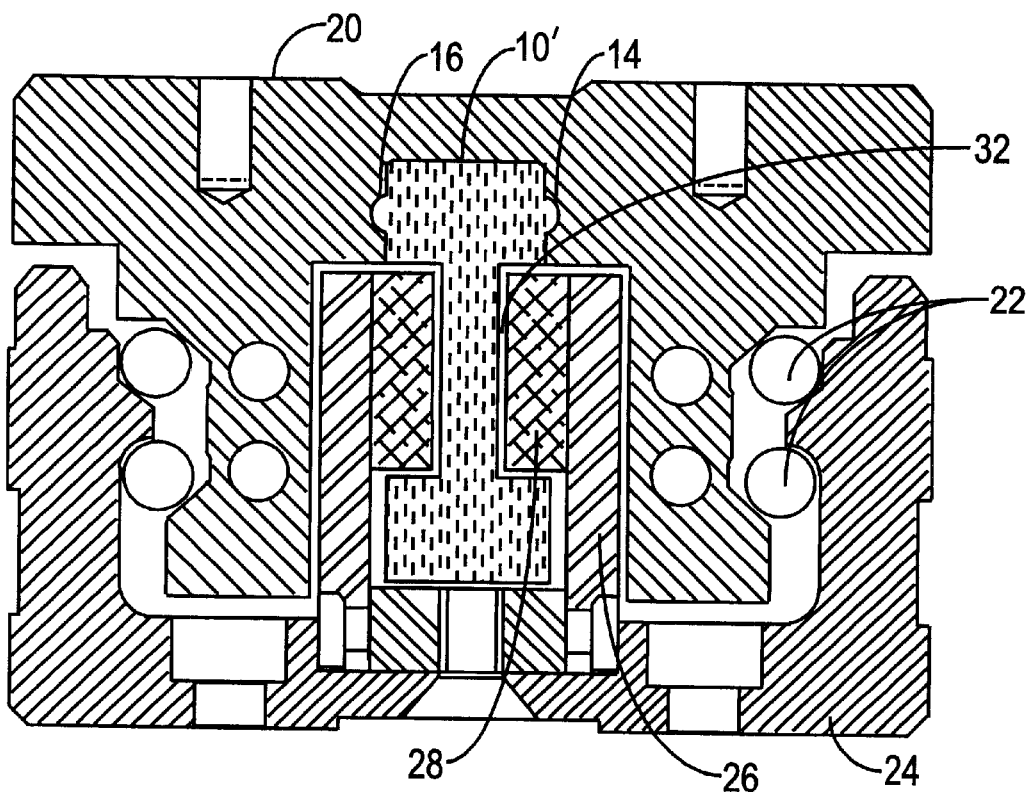
FIG. 2 is a detailed cross-sectional view of another embodiment of the present invention, including the keyed interface between the coil and a carrier.

In FIG. 1a, the preferred coil assembly 10 and mounting bracket 12, including the keyed interface 14 and 16, respectively, are depicted in cross-section. The coil 10 preferably is manufactured for use in an iron core or ironless linear motor, having a T-type or I-beam type cross-section. Included in the end turn portion 18 is the keyed interface 14 associated with the coil. The mounting bracket likewise includes key interface 16, which is mated with interface 14, as shown. Interface 14 and 16 are provided as a slide-in feature for the coil or bracket, thereby permitting any bracket configuration to be mated with any coil assembly configuration. The key feature also permits relative movement in one direction, while preventing disengagement of the coil from the bracket. The coil or bracket shown can be assembled or separated as motor subassemblies, which can be inventoried separately in reasonable quantities, that can be quickly transformed for an application-specific assembly by matching a coil with a bracket. Alternatively, the coil could be provided as an integrated assembly, as shown in FIG. 1B. FIG. 1B depicts the assembled coil and bracket of FIG. 1A.

FIG. 2 depicts a detailed cross-sectional view of another embodiment of the present invention, in which the bracket 12 of FIGS. 1A and 1B is replaced with a carrier 20. In this embodiment, a carrier 20 includes key indents 16, which are mated with protrusions 14 of the coil 10'. The assembly further includes a base 24. Mounted to base 24 are backiron 26 and magnet 28 assembly, as shown. Airgap 32 defines the space between the magnet 28/backiron 26 assembly and the carrier 20. Bearings 22 are provided between base 24 and carrier 20, so that carrier can move linearly with respect to base 24. The magnet/backiron assembly can be affixed to base 24 using conventional techniques. At the interface between the keyed portion of the coil 10' and carrier 20, it is preferred that an epoxy is applied thereto to affix the coil to the carrier. Alternatively, a thermal grease may be applied thereto to promote better heat transfer between the coil and the carrier. Of course, these could be used in combination.

Figure 3:
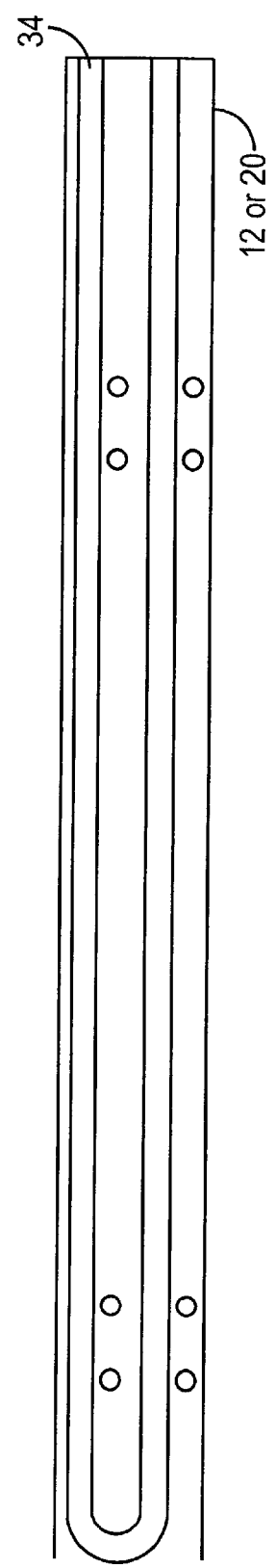
FIG. 3 depicts a top view of the bracket of FIGS 1A and 1B showing another embodiment of a cooling tube integrated within the bracket.

FIG. 3 depicts a top-down view of another embodiment of the bracket 12 or carrier 20 shown in FIGS. 1 and 2. In this embodiment, a cooling tube 34 is formed in the bracket. The cooling tube preferably runs along the entire length of the bracket or carrier. The cooling tube 34 facilitates the use of a cooling liquid (e.g., water, alcohol, etc.) within the bracket or carrier. For certain high-heat applications, it may be preferable to have a closed-loop flow of cooling liquid within the cooling tube. Although the cooling tube may comprise the C-shape shown, it will be understood that any shape could be used without departing from the present invention.

The linear motor coil assembly 10 of the present invention may manufactured according to conventional motor winding techniques, or may be made as taught in U.S. Pat. No. 5,998,890 assigned to the same assignee, and hereby incorporated by reference in its entirety, and adapted to include the keying portions thereon. Thus, there has been provided a linear motor with a slide-in interface assembly that is depicted in the drawings. Modifications to the present invention are possible. For example, although the keyed interface depicted in the drawings generally are shaped as mated indent/detent semicircular pairs, other geometric configurations are possible, and are deemed equivalent to the keyed arrangement shown in the figures. Also, the male/female key interface can reside with either the coil or the bracket.

What is claimed is:

1. A linear motor and bracket assembly, comprising
a coil winding having an end turn portion having a first key portion formed therein; and
a bracket having a second key portion, said first key portion being mated with said second key portion, said mated first and second key portions adapted to permit said bracket and said coil winding to slideably engage one another so that said bracket mechanically engages at least a portion of said end turn portion of said coil winding.

2. An assembly as claimed in claim 1, said bracket formed so as to cover a flange portion of said coil winding so that said bracket contacts said flange portion of said coil.

3. An assembly as claimed in claim 1, wherein said first key portion of said coil comprises one or more protrusions formed to mate with said second key portion.

4. An assembly as claimed in claim 3, wherein said second key portion comprises one or more indents formed to mate with said protrusions.

5. An assembly as claimed in claim 1, wherein said first key portion of said coil comprises one or more indents formed to mate with said second key portion.

6. An assembly as claimed in claim 5, wherein said second key portion comprises one or more protrusions formed to mate with said indents.

7. An assembly as claimed in claim 1, said bracket further comprising a cooling tube formed therein.

8. An assembly as claimed in claim 7, said cooling tube having cooling liquid therein to transfer heat from said bracket to said cooling liquid.

9. A linear motor as claimed in claim 1, said coil having a cross section selected from an I-beam cross section or a T-beam cross section.

10. A linear motor with keyed mounting arrangement, comprising
a coil winding having an end turn portion having a first key portion formed therein;
a carrier removably affixed to said end turn portion having a second key portion, said first key portion being mated with said second key portion, said mated first and second key portions adapted to permit said carrier and said coil winding to slideably engage one another so that said carrier covers at least a portion of said end turn portion of said coil winding; and
a base unit having a backiron and a magnet affixed thereto arranged about said coil.

11. A linear motor as claimed in claim 10, further comprising one or more bearing between said base unit and said carrier to permit said carrier and said coil to slide along said base.

12. A linear motor as claimed in claim 10, said coil having an I-beam cross section and said carrier formed so as to cover said end turn portion of said coil.

13. A linear motor as claimed in claim 10, wherein said first key portion of said coil comprises one or more protrusions formed to mate with said second key portion.

14. A linear motor as claimed in claim 13, wherein said second key portion comprises one or more indents formed to mate with said protrusions.

15. A linear motor as claimed in claim 10, wherein said first key portion of said coil comprises one or more indents formed to mate with said second key portion.

16. A linear motor as claimed in claim 15, wherein said second key portion comprises one or more protrusions formed to mate with said indents.

17. A linear motor as claimed in claim 10, said carrier further comprising a cooling tube formed therein.

18. A linear motor as claimed in claim 10, said cooling tube having cooling liquid therein to transfer heat from said bracket to said cooling liquid.

19. A linear motor as claimed in claim 10, said coil having a cross section selected from an I-beam cross section or a T-beam cross section.

* * * * *